(12) United States Patent
Lorenzen et al.

(10) Patent No.: US 11,209,516 B2
(45) Date of Patent: Dec. 28, 2021

(54) MEASURING DEVICE AND MEASURING METHOD FOR EMULATING AN ANGLE OF DEPARTURE DETERMINING TEST SIGNAL

(71) Applicant: Rohde & Schwarz GmbH & Co. KG, Munich (DE)

(72) Inventors: Rolf Lorenzen, Taufkirchen (DE); Brian Glover, Aldershot (GB); Nirmalan Thiruvadivel, Harrow (GB)

(73) Assignee: Rohde & Schwarz GmbH & Co. KG, Munich (DE)

( * ) Notice: Subject to any disclaimer, the term of this patent is extended or adjusted under 35 U.S.C. 154(b) by 244 days.

(21) Appl. No.: 16/233,600

(22) Filed: Dec. 27, 2018

(65) Prior Publication Data

US 2020/0018811 A1 Jan. 16, 2020

(30) Foreign Application Priority Data

Jul. 12, 2018 (CN) .......................... 201810763565.3

(51) Int. Cl.

| | |
|---|---|
| *G01S 3/32* | (2006.01) |
| *G01S 1/04* | (2006.01) |
| *G01S 3/46* | (2006.01) |
| *G01S 5/02* | (2010.01) |
| *G01S 3/26* | (2006.01) |
| *G01S 3/00* | (2006.01) |
| *G01S 3/38* | (2006.01) |
| *G01S 1/10* | (2006.01) |

(52) U.S. Cl.
CPC .............. *G01S 3/32* (2013.01); *G01S 1/042* (2013.01); *G01S 3/00* (2013.01); *G01S 3/26* (2013.01); *G01S 3/38* (2013.01); *G01S 3/46* (2013.01); *G01S 5/0284* (2013.01); *G01S 1/10* (2013.01)

(58) Field of Classification Search
CPC ..... G01S 3/32; G01S 3/00; G01S 3/38; G01S 3/46; G01S 3/026
See application file for complete search history.

(56) References Cited

U.S. PATENT DOCUMENTS

| | | | | |
|---|---|---|---|---|
| 10,103,823 | B1 * | 10/2018 | Kyrolainen | ........... H04W 24/06 |
| 10,110,326 | B1 * | 10/2018 | Kyrolainen | ............ H04B 17/29 |
| 10,222,445 | B2 * | 3/2019 | Cummings | ............ H01Q 25/00 |
| 10,243,628 | B2 * | 3/2019 | Reed | .................... H04B 17/391 |
| 10,756,828 | B2 * | 8/2020 | Liang | ................... H04B 7/0608 |
| 2011/0299570 | A1 * | 12/2011 | Reed | .................. H04B 17/0085 |
| | | | | 375/130 |

(Continued)

FOREIGN PATENT DOCUMENTS

WO WO2016026431 A1 2/2016

*Primary Examiner* — Thomas M Hammond, III
(74) *Attorney, Agent, or Firm* — Potomac Technology Law, LLC

(57) ABSTRACT

A measuring device for providing an angle of departure determining test signal to a device under test, is provided. The measuring device comprises a signal generator and a single output port. The signal generator is adapted to generate the angle of departure determining test signal, emulating an antenna array angle of departure determining signal, comprised of a plurality of individual array antenna signals, thereby emulating an angle of departure of the angle of departure determining test signal. The single output port is adapted to output the angle of departure determining test signal to the device under test.

12 Claims, 4 Drawing Sheets

(56) References Cited

U.S. PATENT DOCUMENTS

| | | | |
|---|---|---|---|
| 2015/0215053 A1* | 7/2015 | Kyosti | H04B 7/0615 |
| | | | 455/67.16 |
| 2016/0233970 A1* | 8/2016 | Reed | H04B 17/12 |
| 2019/0280791 A1* | 9/2019 | Dhananjay | H04B 7/0456 |
| 2019/0310341 A1* | 10/2019 | Wang | G01S 3/02 |
| 2020/0028598 A1* | 1/2020 | Jing | H04B 17/26 |

* cited by examiner

MEASURING DEVICE AND MEASURING METHOD FOR EMULATING AN ANGLE OF DEPARTURE DETERMINING TEST SIGNAL

RELATED APPLICATIONS

This application claims priority from China Patent Application No. CN201810763565.3 (filed 2018 7 Dec.), the entirety of which is incorporated by reference herein.

TECHNICAL FIELD

The invention relates to measuring the ability of a device under test to correctly determine an angle of departure of a signal received by the device under test, especially for Bluetooth devices under test. The invention relates to measuring the trigger to frame time accuracy in measurement equipment, especially in CDMA measurement equipment.

BACKGROUND

In recent years, mobile communications devices have been fitted with location determining units, usually satellite based location determining units, such as GPS. Such systems though rely on line of side conditions to the employed satellites, in order to accurately determine the location of the mobile device. Therefore, these solutions are not suitable for accurately determining the position of a mobile device indoors.

In order to improve the situation, information regarding available communication networks, for example Wi-Fi hotspots or cell towers of mobile communications networks have been used for improving the localization accuracy. These approaches though also prove insufficient for accurately positioning mobile devices with an accuracy of only a few meters.

One solution to this problem is to provide a transmitter transmitting an angle of departure determining signal to the device under test. This signal is transmitted via an antenna array and comprises a plurality of individual array antenna signals. These signals are not transmitted simultaneously, but successively. Due to the slightly different locations of the individual antennas of the antenna array, each of the array antenna signals arrives at the mobile device with a slightly different phase and amplitude. From these phase- and amplitude-differences and a known location and orientation of the individual antennas of the antenna array, the mobile device can then calculate the angle of departure of the angle of departure determining signal and can therefrom determine where exactly itself is located with regard to the location of the transmitter. Such a system is for example shown in the document WO 2016/026431 A1.

In order to test the ability of a device under test to accurately determine an angle of departure from such angle of departure determining signals, so far, complicated hardware setups using a plurality of antennas comprised by an antenna array, was necessary.

Accordingly, there is a need to provide a measuring device and measuring method for determining the ability of a device under test to accurately determine the angle of departure with a reduced hardware complexity.

SUMMARY

Embodiments of the present invention advantageously address the foregoing requirements and needs, as well as others, by providing a measuring device and measuring method for determining the ability of a device under test to accurately determine the angle of departure with a reduced hardware complexity.

According to a first aspect of the invention, a measuring device for providing an angle of departure determining test signal to a device under test, is provided. The measuring device comprises a signal generator. The signal generator is adapted to generate the angle of departure determining test signal, whereby emulating an antenna array angle of departure determining signal, comprised of a plurality of individual array antenna signals, whereby emulating an angle of departure of the angle of departure determining test signal.

Preferably the measuring device comprises a single output port. The single output port is adapted to output the angle of departure determining test signal to the device under test. It is thereby possible to use a hardware setup having only a single transmitter, output port and antenna, which significantly reduces the hardware effort.

Preferably, the angle of departure determining test signal comprises individual array antenna signals emulating the individual array antenna signals of the antenna array angle of departure determining signal, successively. The individual array antenna signals of the angle of departure determining test signal comprise a partially identical signal content preferably a continuous wave content. This makes it especially easy to perform the further processing.

Further advantageously, the signal generator is adapted to generate each of the antenna array signals with a length of between 0.1 microseconds and 1000 microseconds, preferably between 1 microsecond and 10 microseconds, most preferably between 1.5 and 2.5 microseconds. This allows the emulation of communications signals according to a great number of different communications standards.

Advantageously, the signal generator is adapted to vary an angle of departure emulated by the angle of departure determining test signal, by modifying the individual array antenna signals. It is thereby very simply possible to determine the ability of the device under test to correctly identify different angles of departure.

Advantageously, the signal generator is adapted to vary the angle of departure emulated by the angle of departure determining test signal by modifying the individual array antenna signals with regard to their amplitude and/or their phase compared to each other. This allows for an especially flexible setting of the angle of departure.

Further advantageously, the measuring device comprises a communication unit, adapted to receive an angle of departure value determined by the device under test. The measuring device is then adapted to determine if the received angle of departure value corresponds to the angle of departure of the angle of departure determining test signal. This allows for an automatic completion of the test.

Advantageously, the measuring device moreover comprises a user interface, adapted to accept user input with regard to the angle of departure of the angle of departure determining test signal and/or with regard to amplitude values and/or phase values of the individual array antenna signals. The signal generator is then adapted to generate the angle of departure determining test signal based upon the user input. This allows a user to very flexibly set the test conditions.

According to a second aspect of the invention, a measuring system comprising a measuring device according to the first aspect and the device under test is provided. This allows for a complete test within the measuring system.

According to a third aspect of the invention, a measuring method for providing an angle of departure determining test signal to a device under test is provided. The method comprises generating the angle of departure determining test signal, whereby emulating an antenna array angle of departure determining signal, comprised of a plurality of individual array antenna signals, whereby emulating an angle of departure of the angle of departure determining test signal, and outputting the angle of departure determining test signal to the device under test.

Preferably there is used only a single output port. It is thereby possible to use a hardware setup having only a single transmitter, output port and antenna, which significantly reduces the hardware effort.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

An exemplary embodiment of the invention is now further explained by way of example only but not for limitation with respect to the drawings, in which.

DETAILED DESCRIPTION

A measuring device and measuring method for determining the ability of a device under test to accurately determine the angle of departure with a reduced hardware complexity are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 1:
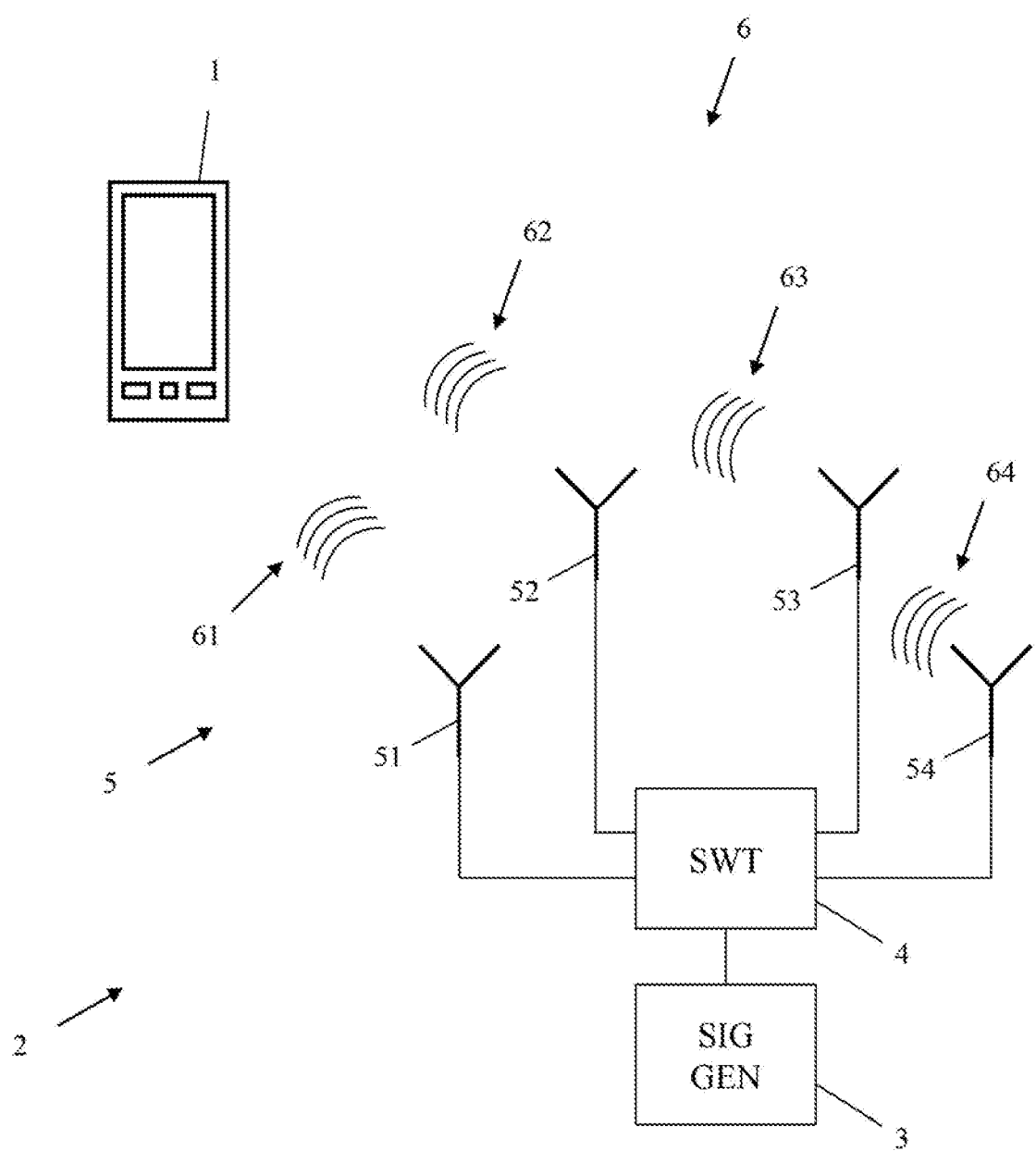
FIG. 1 shows an exemplary mobile communications device performing an angle of departure determining with regard to a multi-antenna transmitter.
Figure 4:
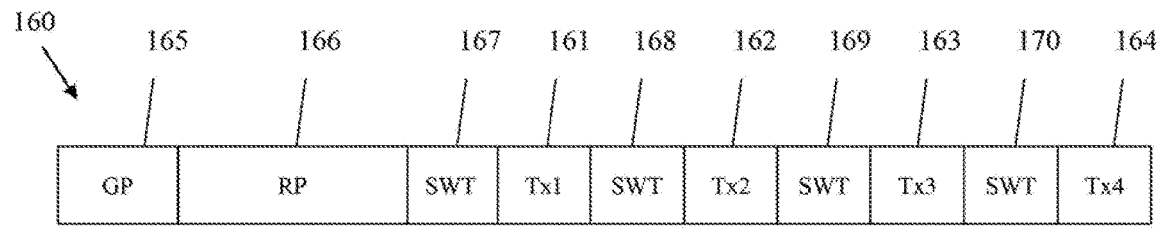
FIG. 4 shows the construction of a test signal as used in an embodiment of the measuring device according to the first aspect of the invention.

First, we demonstrate the general function of the angle of departure determining with regard to FIG. 1. Along FIG. 2, the construction of an antenna array angle of departure determining signal is shown. With regard to FIG. 3, the construction and function of an embodiment of the measuring device according to the first aspect of the invention and the measuring system according to the second aspect of the invention is shown. In FIG. 4, an angle of departure determining test signal is shown. Finally, along FIG. 5, the detailed function of the measuring method of the third aspect of the invention is described. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

In FIG. 1, a device under test 1 is in communications connection to an angle of departure determining transmitter 2. The angle of departure determining transmitter 2 comprises a signal generator 3, which is connected to a switch 4, which again is connected to a plurality of antennas 51, 52, 53, 54, forming an antenna array 5. The signal generator 3 is adapted to successively generate a plurality of individual array antenna signals 61, 62, 63, 64, which correspond to the antennas 51-54 of the antenna array 5. The signals 61-64 are provided to the switch 4 by the signal generator 3. The switch 4 switches the signal generator 3 between the different antennas 51-54 of the antenna array 5, so that the respective signal intended for a specific antenna 51-54 reaches its designated antenna and is then transmitted towards the device under test 1. The signal 61-64 together form an antenna array angle of departure determining signal 6.

Since the distances of the individual antennas 51-54 of the antenna array 5 to the device under test 1 slightly differ, the array antenna signals 61-64 reach the device under test 1 with slightly differing amplitude and phase. From these amplitude- and phase-variations, the device under test 1 can now calculate the angle of departure, which gives the device under test 1 all necessary information to determine, in which direction from the transmitter 2 it is located. This is possible, because the device under test 1 knows the spatial information regarding the antenna array 5, beforehand. This information can either be transmitted to the device under test 1, or be stored within the device under test 1.

Figure 2:
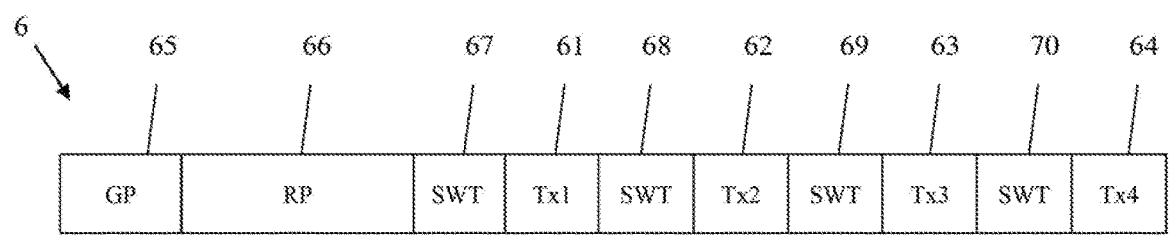
FIG. 2 shows an exemplary construction of an angle of departure determining test signal.

In FIG. 2, a respective antenna array angle of departure determining signal 6 is shown. The antenna array angle of departure determining signal 6 comprises a guard period 65, followed by a reference period 66, followed by a switching period 67, followed by a first array antenna signal 61, followed by a further switching period 68, followed by a second array antenna signal 62, followed by a further switching period, followed by a third array antenna signal 63, followed by a further switching period, followed by a further array antenna signal 64.

The signal 6 though is not limited to only four individual array antenna signals 61-64. Also a plurality of up to hundreds of array antenna signals can be transmitted successively. Also a successive transmission with each of the antennas 51-54 is possible. In this case, for example after transmitting the fourth array antenna signal 64, and a further switching period, again, the first array antenna signal 61 would be transmitted by the first antenna 51, and so on.

It is important to note that during the switching periods advantageously 67, 68, 69, 70, no signals are transmitted. Also it is important to note that during the guard period and the reference period 65, 66, the switching between the different antennas is advantageously not performed. These slots are transmitted by only a single antenna.

Advantageously, the duration of the guard period is 4 microseconds, the duration of the reference period is 8 microseconds, the duration of each of the switching periods is 1 or 2 microseconds and the duration of each array antenna signal is 1 or 2 microseconds. Also longer or different time periods for the individual slots are possible.

Moreover, it is important to note that the individual array antenna signals are advantageously at least partially identical to each other, especially continuous wave signals are advantageously used. It is then especially simple to determine the phase- and amplitude-difference between the successively received signals.

First Embodiment

Figure 3:
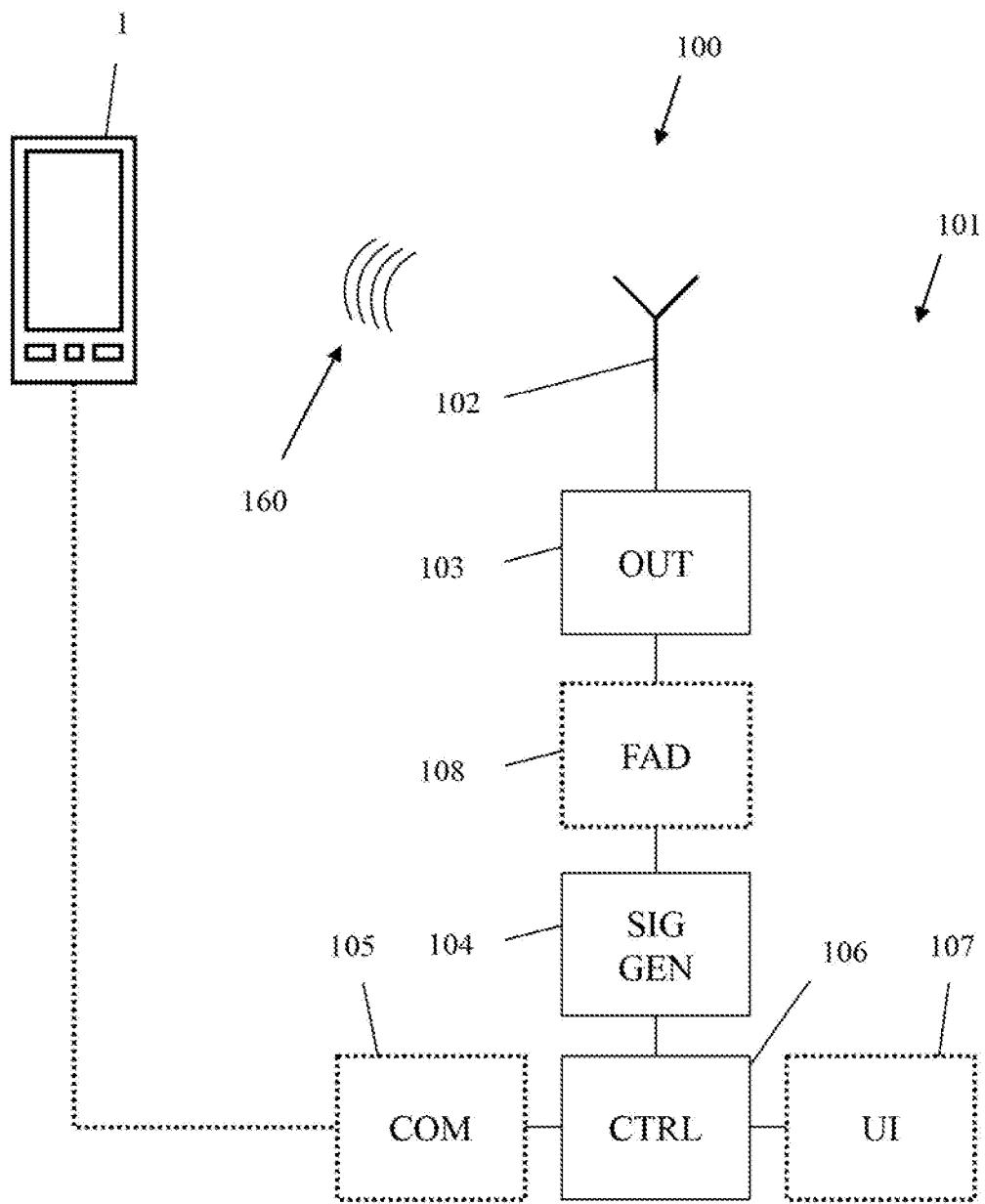
FIG. 3 shows an embodiment of the measuring device of the first aspect of the invention and the measuring system of the second aspect of the invention in a block diagram.

Now, in FIG. 3, an embodiment of the measuring device 101 according to the first aspect of the invention is shown. The measuring device 101 comprises a controller 106 connected to a communications unit 105, which is connected to a device under test 1. The controller 106 is moreover connected to a signal generator 104, which is connected to a fader 108, which again is connected to a single output port 103, which is moreover connected to a single antenna 102. The controller 106 is moreover connected to a user interface 107. The communications unit 105, the user interface 107 and the fader 108 though are only optional components though. In case the fader 108 is not present, the signal generator 104 is directly connected to the output port 103. In case the communications unit 105 is not present, the device under test 1 is not connected to the controller 106.

The measuring device 101 together with the device under test 1 form an embodiment of the measuring system 100 according to the second aspect of the invention.

The controller 106 is adapted to control all remaining components. When performing a test, the controller 106 instructs the signal generator 104 to generate an angle of departure determining test signal 160, emulating an antenna array angle of departure determining signal 6, as shown in FIG. 1 and FIG. 2. Regarding the structure of the angle of departure determining test signal, it is referred to the later elaborations of FIG. 4, but also to the elaborations regarding FIG. 2. Especially, the signal generator 104 generates the angle of departure determining test signal 160 by emulating an antenna array angle of departure determining signal 6 comprised of a plurality of individual array antenna signals 61-64, thereby emulating an angle of departure of the angle of departure determining test signal.

In case the measuring device 101 comprises the fader 108, the angle of departure determining test signal passes the fader 108, which adds fading to the angle of departure determining test signal 160, before transmission. The faded signal is then handed to the output port 103.

Otherwise the angle of departure determining test signal 160 is directly handed to the output port 103 by the signal generator 104. The output port 103 outputs it to the antenna 102, which again transmits it to the device under test 1. The device under test 1 receives the angle of departure determining test signal 160 and determines an angle of departure therefrom. Especially, the device under test 1 uses additional knowledge regarding the location and orientation of the individual antennas of the emulated antenna array in order to determine the emulated angle of departure.

In case the measuring device 101 comprises a communications unit 105, the device under test 1 then transmits the determined angle of departure value to the communications unit 105, which hands this value to the controller 106, which then compares the angle of departure value determined by the device under test 1 to the emulated angle of departure and thereby determines, if the device under test 1 successfully determined the angle of departure.

In case the measuring device 101 moreover comprises the user interface 107, it is adapted to accept user input with regard to the angle of departure to emulate and/or with regard to the individual phase- and/or amplitude-differences of the respective array antenna signals. These user inputs are then handed to the controller 106, which instructs the signal generator 104 to generate the angle of departure determining test signal 160 according to these user inputs.

Second Embodiment

In FIG. 4, the construction of the before-described angle of departure determining test signal 160 is shown. It is important to note that the angle of departure determining test signal 160 is constructed just as the antenna array angle of departure determining signal 6 of FIG. 2.

The angle of departure determining test signal 160 also comprises a guard period 165, followed by a reference period 166, followed by a switching period 167, followed by a first array antenna signal 161, followed by a further switching period 168, followed by a second array antenna signal 162, followed by a further switching period 169, followed by a third array antenna signal 163, followed by a further switching period 170, followed by a further array antenna signal 164. The signal 160 though is not limited to only four individual array antenna signals 161-164. Also a plurality of up to hundreds of array antenna signals can be transmitted successively. Also a successive transmission with each of the antennas is possible. In this case, for example after transmitting the fourth array antenna signal 164, and a further switching period, again, the first array antenna signal 161 would be transmitted, and so on.

It is important to note that during the switching periods 167, 168, 169, 170, advantageously no signals are transmitted. Also it is important to note that during the guard period 165 and the reference period 166, the switching between the different antennas is advantageously not performed. These slots are transmitted by only a single antenna.

Advantageously, the duration of the guard period is 4 microseconds, the duration of the reference period is 8 microseconds, the duration of each of the switching periods is 1 or 2 microseconds and the duration of each array antenna signal is 1 or 2 microseconds. Also longer or different time periods for the individual slots are possible.

Moreover, it is important to note that the individual array antenna signals are advantageously at least partially identical to each other, especially continuous wave signals are advantageously used. It is then especially simple to determine the phase- and amplitude-difference between the successively received signals.

In order to emulate the angle of departure, the individual array antenna signals 161-164 are varied, especially with regard to their amplitude and/or phase, so as to emulate the different distances of the device under test 1 to the antennas of the emulated array.

Third Embodiment

Figure 5:
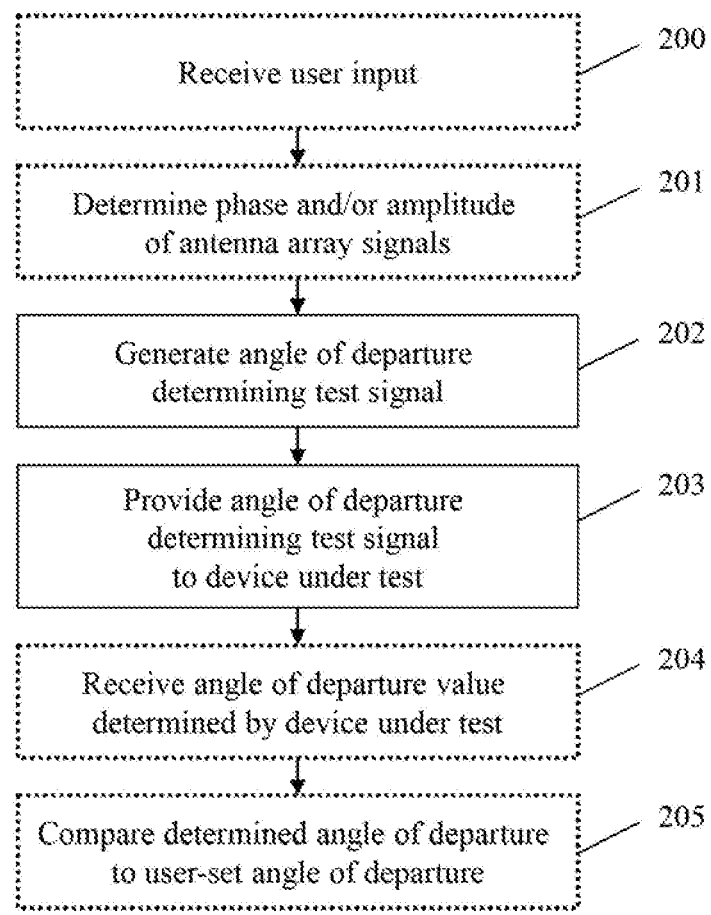
FIG. 5 shows an embodiment of the measuring method according to the third aspect of the invention.

Finally, along FIG. 5, an embodiment of the inventive method according to the third aspect is shown. In a first optional step 200, user input with regard to the angle of departure and/or phase-shift and/or amplitude-shift of the individual array antenna signals to be emulated is received. In a second optional step 201, the resulting phase and/or amplitude of the resulting antenna array signals is determined. In a third step 202, an angle of departure determining test signal is generated. In case the optional steps 200 and 201 were performed, this angle of departure determining test signal is generated based upon the user input and the determined antenna array signals. In a fourth step 203, the angle of departure determining test signal is then provided to the device under test. In an optional step 204, an angle of departure value determined by the device under test is received. In a final optional step 205, this determined angle of departure is compared to the user said angle of departure, which was set with the user input of step 200.

The inventive measuring device according to the first aspect and the inventive measuring system according to the second aspect very closely correspond to the measuring method according to the third aspect. Therefore, the disclosure with regard to any of the aspects is also relevant with regard to the other aspects of the invention.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to a specific number of antennas of the antenna array. Also a limitation to a specific communications standard is not intended, although the invention is described along the Bluetooth LE standard. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A measuring device for providing an angle of departure determining test signal to a device under test, comprising:
a signal generator adapted to generate the angle of departure determining test signal by emulating an antenna array angle of departure determining signal, comprised of a plurality of individual array antenna signals, and by emulating an angle of departure of the angle of departure determining test signal;
a single output port adapted to output the angle of departure determining test signal to the device under test;
a single antenna connected to the single output port; and
wherein the individual array antenna signals of the antenna array angle of departure determining signal successively emulate the individual array antenna signals of the antenna array angle of departure determining signal,
wherein the individual array antenna signals of the antenna array angle of departure determining test signal are successively transmitted via only the single antenna, and
wherein the individual array antenna signals of the angle of departure determining test signal comprise a partially identical signal content.

2. The measuring device according to claim 1, wherein the partially identical signal content comprises a continuous wave content.

3. The measuring device according to claim 1, wherein the signal generator is adapted to generate each of the array antenna signals with a length of between 0.1 micro-seconds and 1000 micro-seconds.

4. The measuring device according to claim 1, wherein the signal generator is adapted to vary an angle of departure emulated by the angle of departure determining test signal by modifying the individual array antenna signals.

5. The measuring device according to claim 4, wherein the signal generator is adapted to vary the angle of departure emulated by the angle of departure determining test signal by modifying the individual array antenna signals with regard to their amplitude.

6. The measuring device according to claim 4, wherein the signal generator is adapted to vary the angle of departure emulated by the angle of departure determining test signal by modifying the individual array antenna signals with regard to their phase compared to each other.

7. The measuring device according to claim 4, wherein the signal generator is adapted to vary the angle of departure emulated by the angle of departure determining test signal by modifying the individual array antenna signals with regard to their amplitude and with regard to their phase compared to each other.

8. The measuring device according to claim 1, further comprising:
a communication unit adapted to receive an angle of departure value determined by the device under test; and
wherein the measuring device is adapted to determine if the received angle of departure value corresponds to the angle of departure of the angle of departure determining test signal.

9. The measuring device according to claim 1, further comprising:
a user interface adapted to accept user input with regard to the angle of departure of the angle of departure determining test signal and/or with regard to amplitude values and/or phase values of the individual array antenna signals; and
wherein the signal generator is adapted to generate the angle of departure determining test signal based upon the user input.

10. The measuring device according to claim 1, further comprising:
a fader adapted to introduce fading into the angle of departure determining test signal.

11. A measuring system comprising:
a device under test; and
a measuring device for providing an angle of departure determining test signal to the device under test,
wherein the measuring device comprises a signal generator adapted to generate the angle of departure determining test signal by emulating an antenna array angle of departure determining signal, comprised of a plurality of individual array antenna signals, and by emulating an angle of departure of the angle of departure determining test signal, and comprises a single output port adapted to output the angle of departure determining test signal to the device under test and a single antenna connected to the single output port,
wherein the individual array antenna signals of the antenna array angle of departure determining signal successively emulate the individual array antenna signals of the antenna array angle of departure determining signal,
wherein the individual array antenna signals of the antenna array angle of departure determining test signal are successively transmitted via only the single antenna, and
wherein the individual array antenna signals of the angle of departure determining test signal comprise a partially identical signal content.

12. A measuring method for providing an angle of departure determining test signal to a device under test, comprising:
generating, by a signal generator of a measuring device, the angle of departure determining test signal;
emulating, by the signal generator of the measuring device, an antenna array angle of departure determining signal, comprised of a plurality of individual array antenna signals, thereby emulating, by the signal generator of the measuring device, an angle of departure of the angle of departure determining test signal; and
outputting the angle of departure determining test signal to the device under test via a single output port of the measuring device; and
wherein the individual array antenna signals of the antenna array angle of departure determining signal successively emulate the individual array antenna signals of the antenna array angle of departure determining signal,
wherein the individual array antenna signals of the antenna array angle of departure determining test signal are successively transmitted via only a single antenna connected to the single output port, and
wherein the individual array antenna signals of the angle of departure determining test signal comprise a partially identical signal content.

* * * * *